(12) United States Patent
Carlsson

(10) Patent No.: US 10,777,075 B2
(45) Date of Patent: Sep. 15, 2020

(54) DEVICE FOR TOLLING OR TELEMATICS SYSTEMS

(71) Applicant: Kapsch TrafficCom AB, Jönköping (SE)

(72) Inventor: Carl-Olov Carlsson, Mullsjö (SE)

(73) Assignee: Kapsch TrafficCom AB, Jonkoping (SE)

( * ) Notice: Subject to any disclaimer, the term of this patent is extended or adjusted under 35 U.S.C. 154(b) by 168 days.

(21) Appl. No.: 14/442,218

(22) PCT Filed: Nov. 19, 2013

(86) PCT No.: PCT/EP2013/074156
§ 371 (c)(1),
(2) Date: May 12, 2015

(87) PCT Pub. No.: WO2014/076300
PCT Pub. Date: May 22, 2014

(65) Prior Publication Data
US 2016/0247398 A1    Aug. 25, 2016

(30) Foreign Application Priority Data
Nov. 19, 2012    (EP) ..................... 12193179

(51) Int. Cl.
*G08G 1/017*    (2006.01)
*G08G 1/04*    (2006.01)
(Continued)

(52) U.S. Cl.
CPC ....... *G08G 1/0175* (2013.01); *G06K 9/00771* (2013.01); *G07B 15/06* (2013.01);
(Continued)

(58) Field of Classification Search
CPC .... G08G 1/0175; G08G 1/04; G06K 9/00771; G06K 2209/15; H04N 7/181; G07B 15/06; G07B 15/063
See application file for complete search history.

(56) References Cited

U.S. PATENT DOCUMENTS 5,568,406 A * 10/1996 Gerber ............... B60R 13/10
116/63 R
6,466,260 B1    10/2002 Hatae et al.
(Continued)

FOREIGN PATENT DOCUMENTS

CL      201103093         12/2011
CL      2012002538 A1     7/2014
(Continued)

OTHER PUBLICATIONS

First Office Action Received for EP Patent Application No. 17150067. 1, dated Mar. 20, 2018, 8 pages.
(Continued)

*Primary Examiner* — Nasim N Nirjhar
(74) *Attorney, Agent, or Firm* — Fiala & Weaver P.L.L.C.

(57) ABSTRACT

The present subject matter relates to a device for tolling or telematics systems provided with a pixel based image sensor. The image sensor is adapted to be arranged above a surveillance zone provided on a road, wherein the surveillance zone has an extension along the direction of the road. The image sensor is adapted to be arranged in between a first and a second end zone of said surveillance zone. The image sensor is provided with a wide-angle optical system having a refraction and which is arranged such, relative said image sensor that an image captured by said image sensor comprises both said first and said second end zone.

10 Claims, 3 Drawing Sheets

Figure 1:
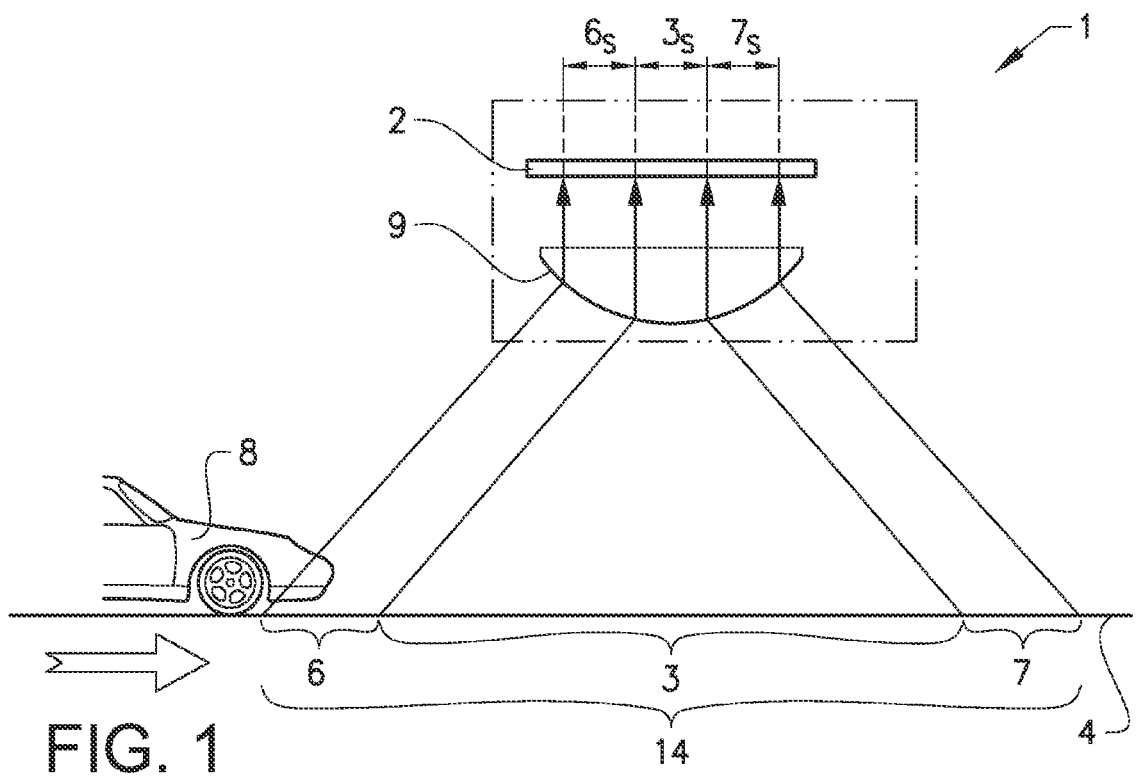

(51) Int. Cl.
  *G07B 15/06* (2011.01)
  *G06K 9/00* (2006.01)
  *H04N 7/18* (2006.01)

(52) U.S. Cl.
  CPC ............. *G07B 15/063* (2013.01); *G08G 1/04* (2013.01); *H04N 7/181* (2013.01); *G06K 2209/15* (2013.01)

(56) References Cited

U.S. PATENT DOCUMENTS

| | | | |
|---|---|---|---|
| 6,959,869 | B2 | 11/2005 | Tsikos et al. |
| 7,295,106 | B1* | 11/2007 | Jackson ............. G06K 9/00771 340/5.8 |
| 2004/0222904 | A1* | 11/2004 | Ciolli .................... G08G 1/052 340/937 |
| 2004/0227703 | A1* | 11/2004 | Lamvik ............. G02B 27/0172 345/76 |
| 2009/0202105 | A1 | 8/2009 | Castro Abrantes et al. |
| 2009/0219387 | A1 | 9/2009 | Marman et al. |
| 2010/0097468 | A1 | 4/2010 | Mayer et al. |
| 2012/0194357 | A1 | 8/2012 | Ciolli |
| 2013/0106622 | A1* | 5/2013 | Paul .................... G08G 1/0175 340/933 |
| 2013/0182114 | A1* | 7/2013 | Zhang .................... H04N 7/18 348/150 |
| 2013/0259314 | A1* | 10/2013 | Kozitsky ............. G06K 9/3258 382/105 |
| 2014/0132804 | A1* | 5/2014 | Guissin ................. G02B 13/06 348/239 |

FOREIGN PATENT DOCUMENTS

| | | | | |
|---|---|---|---|---|
| EP | 1262933 | A1 * | 12/2002 | ............... G08G 1/04 |
| EP | 2535881 | A1 | 12/2012 | |
| EP | 2733677 | A1 | 5/2014 | |
| JP | 2004-206441 | A | 7/2004 | |
| JP | 2005-308961 | A | 11/2005 | |
| RU | 2378700 | C2 | 1/2010 | |
| WO | 2011096840 | A1 | 8/2011 | |
| WO | 2014/076300 | A1 | 5/2014 | |

OTHER PUBLICATIONS

Office Action received for Russian Patent Application No. 2015123662, dated Nov. 17, 2017, 11 Pages of Russian Office Action including 4 Pages of English Translation.
Extended European Search Report received for European Patent Application No. 17150067.1, dated May 17, 2017, 7 pages.
International Search Report and Written opinion received for International Application No. PCT/EP2013/074156, dated Feb. 13, 2014, 11 pages.
First Office Action and Search Report received for Chilean Patent Application No. 1325-2015, dated Nov. 21, 2016, 7 pages (Official Copy only).
First Examination Report received for New Zealand IP No. 707316, dated Jul. 11, 2017, 4 pages.
Extended European Search Report received for European Application No. 12193179.4, dated Apr. 22, 2013, 7 pages.
Notification of Transmittal of the International Preliminary Report on Patentability received for International Application No. PCT/EP2013/074156, dated Nov. 19, 2012, 7 pages.

* cited by examiner

DEVICE FOR TOLLING OR TELEMATICS SYSTEMS

CROSS-REFERENCE TO RELATED APPLICATION(S)

This application is a national phase application based on PCT/EP2013/074156, filed on Nov. 19, 2013, which claims priority to European Patent Application No. 12 193 179.4 filed on Nov. 19, 2012, which are both incorporated by reference herein in their entireties.

BACKGROUND

Technical Field

The present subject matter relates to the field of devices for tolling or telematics systems. In particular, the present subject matter relates to a device which is provided with a pixel based image sensor wherein the image sensor is adapted to be arranged above a surveillance zone provided on a road. The surveillance zone has an extension along the direction of the road, and the image sensor is adapted to be arranged in between a first and a second end zone of the surveillance zone.

Background Art

Road tolling systems are used to detect and register vehicles that are utilizing a road that is subjected to toll fees, sometimes in terms of tax. The most commonly used road tolling systems comprise a gantry with several devices, including a transceiver and sensors, arranged onto it. The transceiver is used for automatic registration of passing vehicles with transponders. Vehicles with transponders are automatically tolled each time they pass a road toll station. The sensors, preferably cameras, are used to capture images of the license plates of passing vehicles without transponders. Depending on the system concept the images can be used to perform tolling based on the license plate number or serve as an evidence of non-compliance in the case transponders are required.

Commonly, two cameras are arranged as a pair on the gantry and positioned to capture one lane of the surveillance zone. The first of the two cameras is directed towards a first end zone wherein vehicles are entering the surveillance zone and the second of the two cameras is directed towards a second end zone wherein the vehicles are exiting the surveillance zone. The cameras are focused at a preset height above the road corresponding to the height of the license plate of the passing vehicles. The height is preset based on the most common height of license plates on a standard vehicle. The images that are captured by the cameras are normally processed in an ANPR (automatic number plate recognition) system.

As described in U.S. Pat. No. 6,959,869 B the cameras capture the front and rear license plate numbers and the numbers are automatically matched to each other by a control device such as a computer. With this system, at least two cameras are needed to capture both the front license plate and the rear license plate. A transceiver is also needed for the automatic reading and tracking of transponders. Hence, several separate devices are used for vehicle detection, tracking and registration which increase the cost of the road tolling systems and increase the visual impact of the gantry with several devices mounted thereon.

With systems as described above, a tracking system utilized between the capturing zones is needed to ensure that the images captured by the two cameras can be linked to the same vehicle.

Devices are often also needed for vehicle classification based on physical characteristics such as size or volume of the vehicle.

BRIEF SUMMARY

An object of the present subject matter is to remove the above mentioned disadvantages with an improved device for use in road toll stations.

An object among others of the present subject matter is to provide a device for tolling or telematics systems that eliminates the problems of a system needing more than one device e.g. several cameras or sensors for vehicle detection, tracking and classification. This object is achieved by a device provided with an image sensor arranged above a surveillance zone and provided with a wide-angle optical system. The present subject matter also describes a method to control a device for tolling or telematics systems.

The present subject matter relates to a device for tolling or telematics systems provided with an image sensor. The image sensor is adapted to be arranged above a surveillance zone in a plane at a predetermined distance from the device. The predetermined distance is adapted to be the distance the device is mounted above a road it is provided to monitor. The surveillance zone has an elongated extension, which when the device is in use is adapted to be aligned with the direction of the road. The image sensor is adapted to be arranged in between a first and a second end zone of said surveillance zone in order to capture both a front and a rear view of a vehicle driving through the surveillance zone.

The image sensor is provided with a wide-angle optical system, which is provided with a refraction and which is arranged such relative said image sensor, that an image captured by said image sensor comprises both said first and said second end zone. The effect of this is that only one image sensor is needed for identification of vehicles passing the surveillance zone since the image sensor can capture the front of vehicles entering the first end zone as well as the rear of vehicles exiting the second end zone. The images comprise the characteristics of the vehicles that can be used for identification, such as license plates or other individual marks, i.e. a "finger print" of the vehicle.

The image captured by the image sensor also comprises the zone in between the first and the second end zone, i.e. the middle of the surveillance zone hence the entire surveillance zone is captured in the image. In the middle of the surveillance zone the image sensor captures the vehicles essentially from above.

According to one aspect, a resolution of the image captured by the image sensor varies and the optical system is arranged such relative said image sensor that the resolution is higher in a part of the image capturing a high prioritized area, specifically, said first and second end zone, and lower in a part of the image capturing a low prioritized area, specifically, a zone between said first and second end zone. The high prioritized area is, for example, the first and second end zone. Which area of the surveillance zone is chosen as high priority depends on the intended use of the device. The first and second end zones are areas in which a vehicle may be captured by the image sensor in an angle such that the front and the rear of the vehicle are captured respectively. Therefore, the first and second end zones are often considered as the high prioritized areas in tolling systems because then the front of a vehicle as it enters the first end zone and the rear of a vehicle as it exits the second end zone are captured in the image with the highest resolution.

In tolling systems the middle zone is often considered the low prioritized area. In the middle zone the vehicles are captured by the image sensor from above at a low resolution, this is because a high resolution image of the top of the vehicle is not needed in order to track the vehicle through the low prioritized area or to classify the vehicle. However, because the image sensor is also capturing the vehicle in the middle zone, the vehicle may be tracked in the entire surveillance zone. Depending on an application of the device the high and low prioritized areas can be provided differently within the surveillance zone.

The first and second end zones will be considered equivalent to the high prioritized areas in the description of the present subject matter that follows. The zone in between the first and the second end zone, the middle zone, will be equivalent to the low prioritized area in the description that follows. The high and low prioritized areas can be provided elsewhere in the surveillance zone and/or be of a larger or smaller number without departing from the scope of the present subject matter.

One advantageous feature of the device is that the image sensor is a pixel base image sensor and that the variation in resolution is excelled with a varied pixel density of said image sensor. The pixel density is higher in the part of the image sensor that captures the first and second end zone and the pixel density is lower in the part of the image sensor capturing the middle of the surveillance zone. The image sensor can thereby comprise fewer pixels compared to if the image sensor has a constant pixel density across the entire image sensor. The lowering in pixel density is achieved with maintained high resolution in the high prioritized area. A high resolution facilitates the identification of the vehicle by license plates or other identifiers on the front and rear of the vehicle, and thus, the high prioritized areas may, for example, be captured in high resolution by the image sensor.

Another advantageous feature of the device is that the variation in resolution is due to a refraction of said optical system, whereby said optical system projects one area unit of said surveillance zone upon a different number of pixels depending on where in said surveillance zone said one area unit is located. The refraction of the optical system may vary with the cut, grind or polish of the lens of the image sensor. The first and second end zones are refracted by the optical system to project on a large number of pixels in the image sensor relative the end zones area. The middle of the surveillance zone is refracted to project on a smaller number of pixels relative the area of the middle of the surveillance zone. Hence, the resolution in the image of the first and second end zone, i.e. the high prioritized areas, is higher than the resolution of the rest of the surveillance zone in the captured image. This enables that the entire surveillance zone can be captured with an image sensor with a lower number of pixels than if the both the end zones and the middle zone of the surveillance zone were projected upon the same number of pixels relative the area of the respective zone. Accordingly, the resolution of the first and second end zone is higher than it would be using a device which does not enable a variation of the refraction of the optical system. Fewer pixels can thereby be used to achieve a resolution of the first and second end zone, and still capture the entire surveillance zone in one image. Fewer pixels lead to lower costs for the image sensor and to images with fewer pixels. Less data memory and less data processing are thereby needed and the processing speed of the whole system using the device is increased and the cost thereof is lowered.

A combination of variation in pixel density of the image sensor and the refraction of the optical system may also be possible. A combination will increase the difference in resolution between the part of the image capturing the first and a second end zone and the part capturing the rest of the surveillance zone. The first and second end zone may be projected by the optical system onto a larger part of the image sensor relative their actual area, determined by the refraction of the optical system, and wherein this large part of the sensor comprising a high pixel density. Analogously the middle zone of the surveillance area is projected by the optical system onto a smaller part of the image sensor relative its actual area, wherein this smaller area comprises a low pixel density. Thereby the characteristics of the vehicles in the first and second end zones are clear and easily read in an image provided from the image sensor, which facilitates a reliable identification of the vehicles.

In one embodiment the optical system comprises a mirror and/or a lens arranged in front of said image sensor and causing said refraction. Thereby, the optical system may be arranged adjacent but not in front of the image sensor. This allows for flexibility in manufacturing of the device, as well as in the positioning of the image sensor and optical system in the device and onto the gantry.

The width and length of the surveillance zone captured by the image sensor is determined by the wide angle optical system characteristics. One advantageous feature of the optical system is that it is provided with a shape enabling a rectangular surveillance zone. Hence, an optical system may capture the width of only one single lane or the width of several lanes. The characteristics of the optical system are also determining the length of the surveillance zone, hence where the first and second end zones are located along the road. Independent of the shape of the optical system the refraction of the optical system may vary as described above.

Alternatively the shape of the optical system may be of fish-eye type, and cover a surveillance area having an extension along the direction of the road as well as the width of several lanes of the road.

One advantageous feature of the present subject matter is that the device may be a part of, or can be combined with sensors providing stereoscopic and/or multidimensional images in which vehicle types and/or heights of vehicles can be detected. The effect of this is that the type of vehicle can be identified. By determining for example the height of a vehicle passing through the surveillance zone the toll fee for that vehicle may automatically be determined e.g. if it is a truck or a car.

The device may also comprise a transceiver for sending and receiving information from passing vehicles transponders. By this means, vehicles with transponders are automatically charged with a toll fee and do not have to be identified by images captured by the image sensor.

The scope of the present subject matter also encompasses a system of devices according to the present subject matter. Such a system having access to images captured by a plurality of devices.

The system of devices may, for example, combine information withdrawn from the images in order to track a vehicle moving between surveillance zones corresponding to different image sensors. One image sensor may correspond to one lane of the road in the surveillance zone. If a vehicle enters the first end zone in one lane, and exits the second end zone in a different lane, i.e. change lane in the middle of the surveillance zone, then the system can combine the information withdrawn from the images captured by the two corresponding sensors. The effect of this is that a vehicle cannot pass the surveillance zone without being registered by the system. The vehicle may also be captured by an image sensor in the middle of the surveillance zone. Hence, the vehicle can more easily be tracked through the entire surveillance zone, by the images sensor continuously capturing images of all plausible positions in the surveillance zone.

According to another aspect of the system it can combine information from images taken by different image sensors in order to estimate a height, a length and/or a volume of a vehicle. Thereby, the vehicle type may be determined and additional stereoscopic sensors may be precluded.

Another aspect is a method to control a device or system of the above described art, wherein the sensor continuously captures images of the surveillance zone. No vehicle can pass the surveillance zone without being captured by the sensor because images are constantly captured. Thereby, the method is trustworthy in respect to making sure all vehicles are registered and that toll is applied to all passing vehicles that should pay toll.

According to another aspect of the method the device or system of the above described art is adapted to be controlled to save an output from the sensor, wherein the output comprises at least a first and a second image wherein the first image comprises characteristics of a front of a vehicle in the first end zone and a second image comprises the characteristics of a rear of the vehicle in the second end zone. The first and second images saved as an output from the sensor are paired and can be used to identify the passing vehicle. Pairing may, for example, be done by identification of the license plate number read in the image. The image pair may also be used to control that the vehicle does not carry false license plates, i.e. a license plate number identified in the first end zone should be identified in an image of the second end zone within reasonable time. If not, the vehicle might be carrying a fake license plate. The image pair may also be saved as a proof that the vehicle did indeed pass the tolling zone, in case of a dispute over the toll applied.

Images comprising characteristics of a front of a vehicle or rear or a vehicle carrying a transponder may not be saved as an output. These vehicles may, for example, be tolled automatically; thereby the images are not needed for identification. However, the images could be saved for other purposes.

Another advantageous aspect of the method is that the output comprises a third image wherein the third image comprises the vehicle in between the first and the second end zone. The vehicle is seen from above in between the first and the second end zone. Thereby, the vehicle may be tracked all the way through the surveillance zone, and proof in the form of images is kept of the passing. This is made possible by continuous capturing by the sensor.

According to the method the device may also be combined with other technology for vehicle identification, such as radio frequency identification.

BRIEF DESCRIPTION OF THE DRAWINGS/FIGURES

Figure 2:
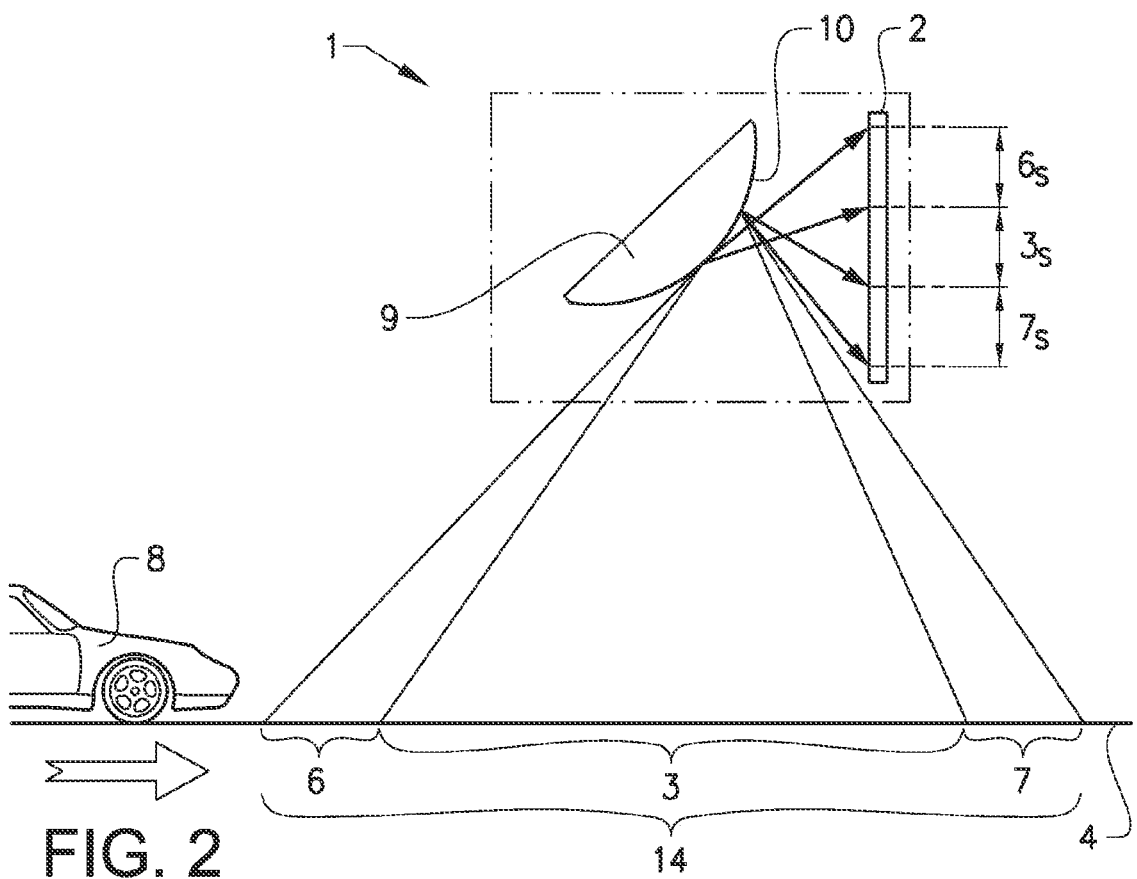
Figure 3:
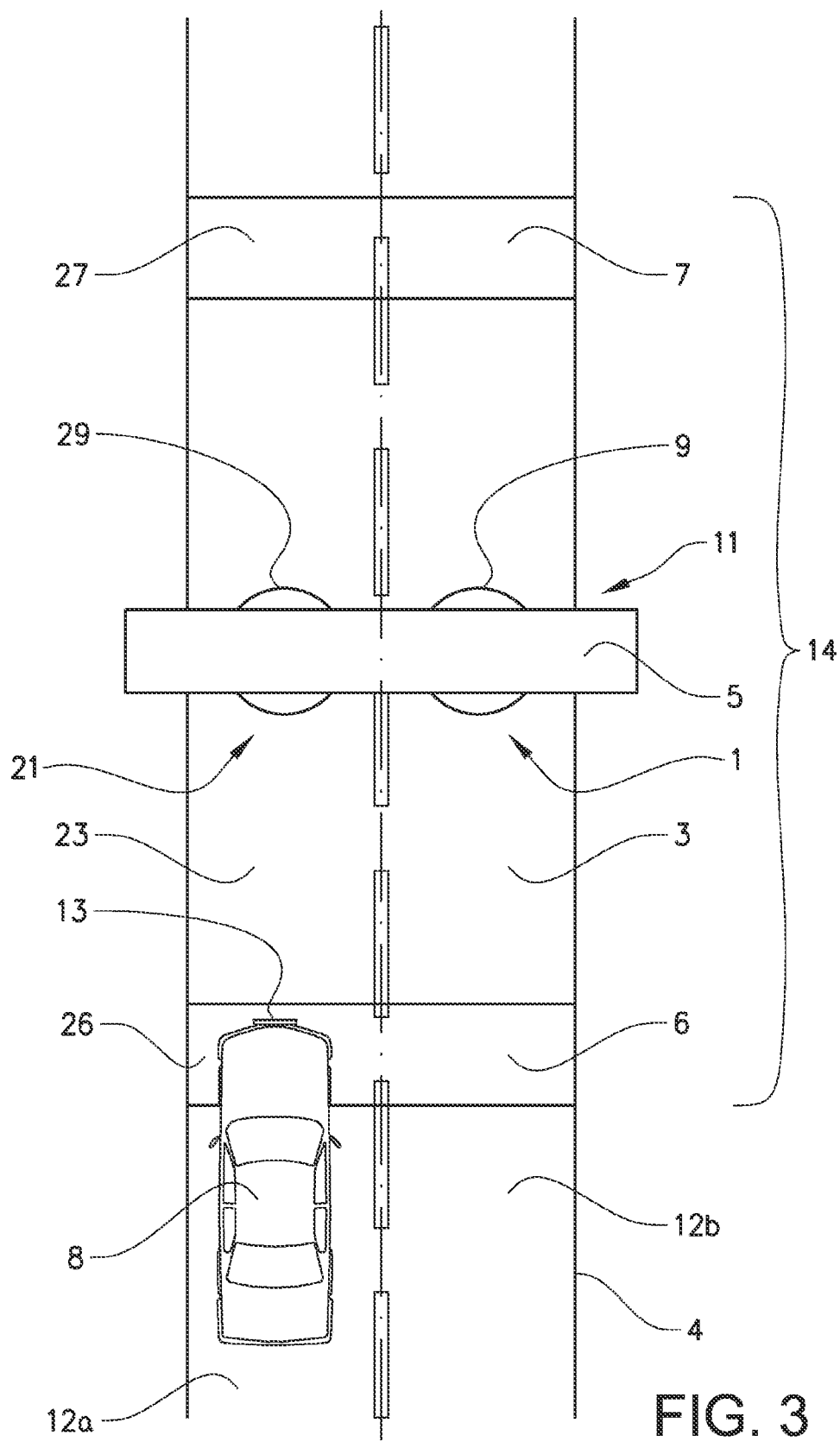
Figure 4:
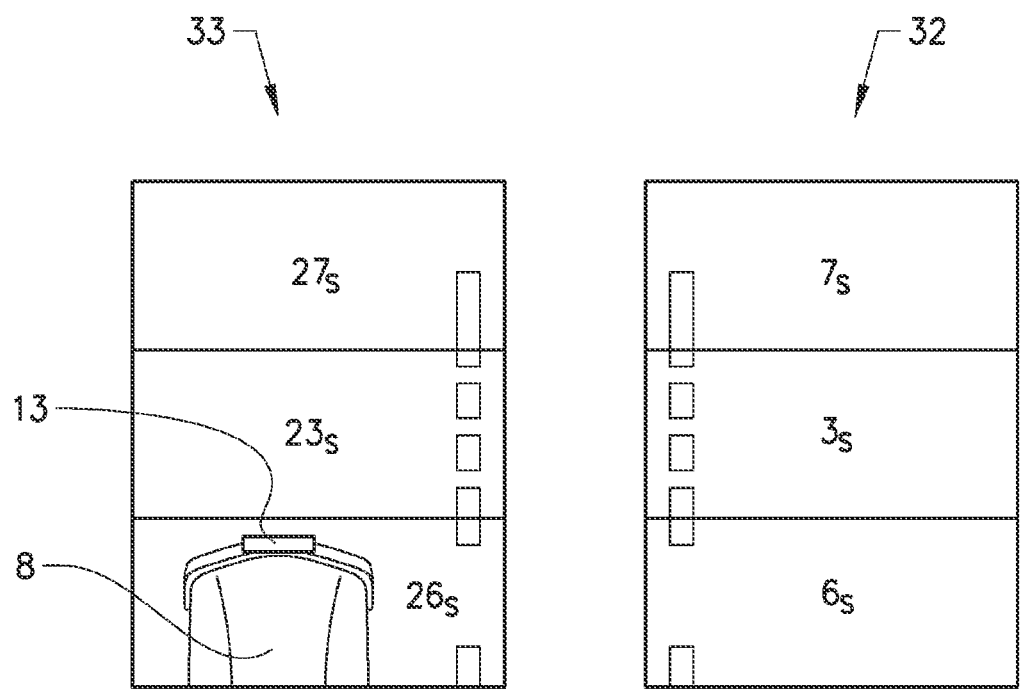

FIG. 1 shows a schematic view of one embodiment.
FIG. 2 shows a schematic view of another embodiment.
FIG. 3 shows a schematic view of an aspect seen from above.
FIG. 4 shows a schematic view of an image sensor according to an embodiment.

DETAILED DESCRIPTION

In the following, embodiments are described. The embodiments are however not limited thereto. All the figures are schematic.

FIG. 1 shows a first embodiment of the device 1 for tolling or telematics systems provided with a pixel based image sensor 2. FIG. 1 further shows a surveillance zone 14 provided on a road 4. The device 1 is adapted upon a gantry (not shown) a predetermined distance above the road, such that the plane of the surveillance zone 14 becomes level with the surface of the road 4. The elongated surveillance zone 14 has an extension along the direction of the road 4. The image sensor 2 is provided with a wide-angle optical system 9. The optical system 9 has a refraction which is arranged such, relative the image sensor 2 that an image captured by the image sensor 2 comprises the first and the second 6, 7 end zone. The refraction and reflection by the optical system 9 upon the image sensor 2 is shown schematically in FIG. 1 and FIG. 2. The cut and grind of the optical system 9 determining the refraction is not shown in the figure.

In FIG. 1 a first vehicle 8 is entering the first end zone 6. The front of the first vehicle 8 is captured in an image by the image sensor 2, as the refraction of the wide-angle optical system 9 covers the entire surveillance zone 14. If a second vehicle (not shown) were to exit the surveillance zone 14 in the second end zone 7 at the same time, the rear of the second vehicle would be captured by the image sensor 2 in the same image. The first and second end zones 6, 7 are high prioritized areas in the embodiment shown in FIG. 1.

FIG. 1 further shows the optical system 9 arranged relative the image sensor 2 such that the resolution is higher in the part of the image capturing said first 6 and second 7 end zone and lower in the part of the image capturing a zone between said first 6 and second 7 end zone. The resolution is set by the pixel density of the image sensor 2 as well as by the refraction of the optical system 9. In FIG. 1 the optical system 9 projects an area unit representing ¼ of the surveillance zone 14, represented by the first and second end zone 6, 7, upon ⅔ of the pixel area of the image sensor 2 in the device 1, i.e. each end zone 6, 7 is projected upon ⅓ of the image sensor each. The first end zone 6 is projected upon the pixel area 6s of the image sensor 2 and the second end zone 7 is projected upon the pixel area 7s of the image sensor 2. The low prioritized area 3 is in between the first and the second end zone 6, 7 in the embodiment shown in FIG. 1. Hence, for the low prioritized area 3, an area unit representing of ¾ of the surveillance zone 14 is being projected upon ⅓ of the pixel area, shown as area 3s, of the image sensor 2. Therefore, the high prioritized areas which are smaller than the low prioritized areas are projected on a larger pixel area comparably, and hence the number of pixels representing the high priority areas compared to number of pixels representing the low priority areas is larger. The resolution of the high priority areas, the first and second end zones 6, 7, is thus high. The density of the pixels in the pixel area of the image sensor 2 whereon the high priority area is projected may also be higher, hence increasing the resolution further.

The surveillance zone 14 may be divided differently, such that the ratio between the high prioritized area and the low prioritized area is greater or smaller, and that the ratio between the projections of the high and low prioritized area upon the image sensor 2 is different as well. The high prioritized area does not have to correspond to the end zones of the surveillance zone 14. Just as before, the first and second end zones 6, 7 will be considered equivalent to general high prioritized areas, and the zone in between the first and the second end zone, the middle zone 3, will be equivalent to a general low prioritized area. The high and low prioritized areas can be provided elsewhere in the surveillance zone and/or be of a larger or smaller number without departing from the scope of the present subject matter.

In another embodiment, shown in FIG. 2, the optical system 9 comprises a mirror 10 arranged in front of the image sensor 2 causing refraction such that the surveillance zone 14 is captured on the image sensor 2. The embodiment in FIG. 2 differs only in that the optical system 9 is of a different kind, the function thereof and the device as such is the same as the embodiment in FIG. 1. Hence, similar as in FIG. 1, the ratio between the areas of the first end zone 6 and second end zone 7 versus the surveillance zone 14 is smaller than the ratio of the two projected on the image sensor 2. Thereby, the first and second end zone 6, 7 is captured by the image sensor 2 with a larger number of pixels and thus at a higher resolution than the middle zone 3 of the surveillance zone 14. The mirror also allows for other ratios than the one exemplified in FIG. 2.

FIG. 3 shows a system 11 of devices 1 according to an embodiment provided with a pixel based image sensor 2, not shown in FIG. 3. The system 11 of devices 1 has access to images captured by a plurality of devices 1, 21. Thereby, the system 11 of devices 1, 21 covers the surveillance zones 14 of lanes 12a, 12b provided on a road 4 in the embodiment shown in FIG. 3. The system 11 combines information withdrawn from the images captured by the image sensors 2, corresponding to the devices 1, 21, in order to track the first vehicle 8 in case it moves between surveillance zones 14 corresponding to different devices 1, 21 and image sensors (not shown in FIG. 3). In FIG. 3 each image sensor 2, not shown in the figure, is provided with an individual optical system 9, and that is capturing the surveillance zone 14 of one individual lane 12a, 12b each. The surveillance zones 14 captured by the individual devices 1, 21 positioned next to each other could also overlap depending on the characteristics of the individual optical systems 9. In the embodiment shown in FIG. 3, the surveillance zones 14 are of rectangular shape, and may overlap between the lanes 12a, 12b in order to handle vehicles that pass between the lanes.

The system 11 of devices 1, 21 combines information from images taken by different image sensors in order to estimate a height, a length and/or a volume of the vehicle 8. Thereby, the vehicle 8 is classified and appropriate toll fees are charged based on the vehicle type, in FIG. 3 a passenger car. The license plate 13 at the front of the vehicle 8 is also captured by the image sensor 2 as the vehicle enters the first end zone 26 of lane 12a. Thereby, the vehicle 8 can be identified by the license plate 13. Alternatively, fingerprint detection could be used to identify the car. In such a method the vehicle is identified based on dents, specific bolts or other characteristics different from the license plate 13.

FIG. 4 shows the projections by the optical systems 9 on the image sensors (not shown in the figure) from the system 11 of devices 1, 21 shown in FIG. 3. The two images 32, 33 in FIG. 4 represent the output of the image sensors, wherein the projections of the first end zones 6, 26 is captured in the areas 6s, 26s of the images 32, 33, the low prioritized middle zones 3, 23 is captured in the areas 3s, 23s and the second end zone 7, 27 is captured in the areas 7s, 27s. As exemplified in FIG. 4, the middle zone 3s, 23s, even though the largest area of the surveillance zone, is represented upon ⅓ of the image 32, 33. The first vehicle 8 is captured at high resolution in the pixel area 26s of the image sensor. Thereby, the license plate 13 is also captured at high resolution and can be used to identify the first vehicle 8. An overlap between the two surveillance zones captured by the two image sensors is shown in FIG. 4. Thereby, the first vehicle 8 can easily be tracked even if it moves between the two lanes 12a, 12b during its passing through the surveillance zone.

Conclusion

The present subject matter is not limited to the specific embodiments presented, but includes all variations within the scope of the present claims.

Reference signs mentioned in the claims should not be seen as limiting the extent of the matter protected by the claims, and their sole function is to make claims easier to understand.

As will be realised, the present subject matter is capable of modification in various obvious respects, all without departing from the scope of the appended claims. Accordingly, the drawings and the description thereto are to be regarded as illustrative in nature, and not restrictive.

What is claimed is:

1. A method to control a system for road tolling comprising a plurality of image sensors, wherein each image sensor of said image sensors is adapted to be mounted in the middle of and at a predetermined distance above a respective surveillance zone of a plurality of surveillance zones provided on a road, each respective surveillance zone having an extension along a direction of said road, wherein each image sensor of said image sensors is adapted to be mounted in between a first and a second end zone of said respective surveillance zone and each image sensor of said image sensors is provided with a respective wide-angle optical system of a plurality of wide-angle optical systems having a refraction and which is arranged relative to the image sensor such that an image captured by each image sensor of said image sensors comprises both said first and said second end zones of said respective surveillance zone, the plurality of image sensors and the plurality of wide-angle optical systems being mounted on a gantry, the method comprising:

continuously capturing first images, by a first image sensor of the plurality of image sensors, of a first surveillance zone of the plurality of surveillance zones;

continuously capturing second images, by a second image sensor of the plurality of image sensors, of a second surveillance zone of the plurality of surveillance zones;

combining information from the first images and the second images in order to estimate at least one of a height, a length or a volume of a vehicle; and saving an output from said image sensors, wherein said output comprises at least a first image, a second image, and a third image from one image sensor of the plurality of image sensors, wherein said first image comprises characteristics of a front of a vehicle in said first end zone, said second image comprises the characteristics of a rear of said vehicle in said second end zone, and said third image comprises said vehicle in a middle zone between said first end zone and said second end zone, the middle zone being larger than said first end zone and said second zone, and wherein a first wide-angle optical system of the plurality of wide-angle optical systems is arranged relative to the first image sensor of the plurality of image sensors such that:

a first resolution of a first portion of the first images that captures said first and second end zones is higher than a second resolution of a second portion of the first images that captures the middle zone; and the first end zone is projected on a first area of the first image sensor, the second end zone is projected on a second area of the first image sensor that is different than the first area, and the middle zone is projected on a third area of the first image sensor that is different than the first area and the second area, wherein the first area, the second area, and the third area being substantially equal.

2. The method according to claim 1, wherein said image sensors are pixel based and variation in resolution is excelled with a varied pixel density of said image sensors.

3. The method according to claim 1, wherein each of said plurality of wide-angle optical systems comprises at least one mirror and/or lens arranged in front of a respective image sensor of the plurality of image sensors and causing refraction.

4. The method according to claim 1, wherein each of said plurality of wide-angle optical systems is provided with a shape enabling a rectangular surveillance zone.

5. The method according to claim 1, wherein said system is part of, or combined with, sensors providing stereoscopic and/or multidimensional images in which vehicle types and/or heights of vehicles can be detected.

6. A system for road tolling, said system is provided with a plurality of image sensors, wherein each of said image sensors is adapted to be arranged in the middle of and at a predetermined distance above a respective surveillance zone of a plurality of surveillance zones provided on a road, each of said plurality of surveillance zones having an extension along a direction of said road, and each of said image sensors is adapted to be mounted in between a first and a second end zone of a respective surveillance zone of the plurality of surveillance zones and each of said image sensors is provided with a respective wide-angle optical system of a plurality of wide-angle optical systems having a refraction and which is arranged relative to a respective image sensor of said image sensors such that an image captured by each of said image sensors comprises both said first and second end zones of a respective surveillance zone of the plurality of surveillance zones, said image sensors and said plurality of wide-angle optical systems being mounted on a gantry, wherein said system is configured to combine information from first images taken by a first image sensor of the plurality of image sensors and second images taken by a second image sensor of the plurality of images sensors in order to estimate at least one of a height, a length, or a volume of a vehicle, wherein a first wide-angle optical system of the plurality of wide-angle optical systems is adapted to and arranged relative to the first image sensor of the plurality of image sensors such that a first resolution of a first portion of the first images that captures said first and second end zones is higher than a second resolution of a second portion of the first images that captures a zone between said first and second end zones, and wherein the first end zone is projected on a first area of the first image sensor, the second end zone is projected on a second area of the first image sensor that is different than the first area, and a middle zone between said first end zone and said second end zone is projected on a third area of the first image sensor that is different than the first area and the second area, the middle zone being larger than said first end zone and said second zone, wherein the first area, the second area, and the third area being substantially equal.

7. The system according to claim 6, wherein said system can combine information withdrawn from said first images and said second images in order to track a vehicle moving between the plurality of surveillance zones.

8. The method according to claim 1, wherein said output consists of one compound image of a respective surveillance zone of the plurality of surveillance zones, wherein said compound image is put together of at least the first and the second image captured at different moments such that said compound image discloses said respective surveillance zone and comprises at least a front view and a rear view of said vehicle in said first and second end zone respectively.

9. The method according to claim 8, wherein said compound image further comprises the third image captured at a third moment such that a view of said vehicle from essentially above and in said middle zone also is comprised in said compound image.

10. The method according to claim 1, wherein said system is combined with other technology for vehicle identification, such as radio frequency identification.

* * * * *